United States Patent
Khan

(10) Patent No.: US 9,342,731 B1
(45) Date of Patent: May 17, 2016

(54) SYSTEM AND METHOD FOR IDENTIFICATION OF FINGERPRINTS

(71) Applicant: Effat University, Jeddah (SA)

(72) Inventor: Mohammed Asmatullah Khan, Jeddah (SA)

(73) Assignee: EFFAT UNIVERSITY, Jeddah (SA)

( * ) Notice: Subject to any disclaimer, the term of this patent is extended or adjusted under 35 U.S.C. 154(b) by 0 days.

(21) Appl. No.: 14/669,363

(22) Filed: Mar. 26, 2015

(51) Int. Cl.
*G06K 9/36* (2006.01)
*G06K 9/00* (2006.01)
*G06T 5/10* (2006.01)
*G06T 5/00* (2006.01)

(52) U.S. Cl.
CPC ............ *G06K 9/00067* (2013.01); *G06T 5/002* (2013.01); *G06T 5/10* (2013.01)

(58) Field of Classification Search
None
See application file for complete search history.

(56) References Cited

U.S. PATENT DOCUMENTS

| | | | |
|---|---|---|---|
| 5,926,555 | A | 7/1999 | Ort et al. |
| 5,963,656 | A | 10/1999 | Bolle et al. |
| 6,072,895 | A | 6/2000 | Bolle et al. |
| 7,689,016 | B2 | 3/2010 | Stoecker et al. |
| 2007/0248249 | A1 | 10/2007 | Stoianov |

FOREIGN PATENT DOCUMENTS

| | | |
|---|---|---|
| CN | 100347719 C | 11/2007 |
| EP | 1066589 B1 | 9/2007 |

OTHER PUBLICATIONS

Robert Hastings, "Ridge Enhancement in Fingerprint Images Using Oriented Diffusion", Digital Image Computing Techniques and Applications, IEEE Computer Society, copyright 2007, pp. 245-252.*

Sihalath et al., "Fingerprint Image Enhancement with Second Derivative Gaussian Filter and Directional Wavelet Transform", 2010 Second International Conference on Computer Engineering and Applications, IEEE publication, 2010, pp. 112-116.*

Oliveira, et al., "Fast Digital Imaging Repainting", Proceedings of the International Conference on Visualization, Imaging and Image Processing (VIIP 2001), pp. 261-266, Sep. 3-5, 2001.

(Continued)

*Primary Examiner* — Brian P Werner
(74) *Attorney, Agent, or Firm* — Michael B. Fein; Eckert Seamans Cherin & Mellott, LLC

(57) ABSTRACT

A method for automated fingerprint identification and special purpose programmed computer for carrying out the method are disclosed. The method and system comprise identifying a scar region in a set of pixels in a fingerprint image by using a second order Gaussian derivative filter parameterized using standard deviation, wherein the scar region has a width greater that the width of a regular ridge or a valley of separation between ridges; wherein a boundary, intensity, and flow direction of each pixel is calculated; each pixel being connected to a next adjacent pixel using flow co-ordinates and flow directions; wherein the Gaussian derivative filter has an output and the output is thresholded to create an output mask with value=1 at the scar regions and value=0 outside the scar regions; and changing the intensity of pixels in the identified scar region with the intensity of the nearest boundary pixel until the intensities of all the pixels in the scar region are changed to the intensity of their flow direction identified boundary pixels.

7 Claims, 3 Drawing Sheets

(56) References Cited

OTHER PUBLICATIONS

Gottschlich, et al., "Robust Orientation Field Estimation and Extrapolation Using Semilogical Line Sensors," Information Forensics and Security, IEEE Transactions, vol. 4, issue 4, pp. 802-811, Dec. 2009.

Yau, et al., "Enhancing Oriented Pattern Using Adaptive Directional FFT Filter", IEEE 2nd International Conference on Information, Communication & Signal Processing, Singapore, Dec. 1999.

Sulong, et al., "A New Scar Removal Technique of Fingerprint Images", ICIC-BME 2009 Proceedings, pp. 131-135. 2009.

Bertalmio et al., "Image Inpainting", SIGGRAPH 2000, Computer Graphics Proceedings, Annual Conference Series, 2000, pp. 417-424.

Bertalmio, et al., "Navier-Stokes, Fluid Dynamics, and Image and Video Inpainting," in ICCV 2001, 2001, pp. 1335-1362.

Telea, "An Image Inpainting Technique Based on the Fast Marching Method," Journal of Graphics Tools, vol. 9, No. 1, pp. 25-36, 2004.

Jin et al., "Pixel-level Singular Point Detection from Multi-scale Gaussian Filtered Orientation Field", Pattern Recognition, No. 43, pp. 3879-3890, 2010.

Anoop et al., "Detection of Fingerprint Alteration Using Scars, Minutiae Density and Ridge Discontinuity," International Journal of Scientific & Engineering Research, vol. 4, issue 8, Aug. 2013.

* cited by examiner

SYSTEM AND METHOD FOR IDENTIFICATION OF FINGERPRINTS

BACKGROUND OF THE INVENTION

The present invention relates to the field of computer processing of fingerprint images. More specifically the invention relates systems and methods for identifying and removing one or more scar regions in a fingerprint image. A fingerprint image with scar regions removed is further processed in an Automatic Fingerprint Identification System (AFIS). An AFIS is used to identify and verify a person by means of their fingerprint.

Current methods and systems for removing scars in an acquired fingerprint image are lacking and insufficient in that they do not quickly, accurately, efficiently, or effectively allow correction of fingerprint images, resulting in false matches and false verification and identification of a person.

It is known in this art that scar lines hinder the ability of AFIS to match an acquired fingerprint image to a reference fingerprint image. Attempts for compensating for the major scar lines in an image have been reported in the literature. For example, a spatial domain based inpainting technique using a diffusion matrix to reconstruct broken ridges was proposed by Oliveira, et al., in "Fast Digital Imaging Repainting," *International Conference on Visualization, Imaging, and Image Processing* (VIIP 2001), 2001. Gottschlich, et al., "Robust Orientation Field Estimation and Extrapolation Using Semilogical Line Sensors," *Information Forensics and Security, IEEE Transactions*, vol. 4, no. 4, pp. 802-811, December 2009, presented a line-sensor based method to estimate the flow of ridges and valleys for removing scar.

Yau, et al., "Enhancing Oriented Pattern using Adaptive Directional FFT Filter, *IEEE $2^{nd}$ International Conference on Information, Communication & Signal Processing*, Singapore, December 1999, discussed reconstructing the oriented ridge patterns in an image. Sulong, et al., "A new Scar Removal Technique of fingerprint images" in ICIC-BME, 2009 proposed a directional filter which strengthens the ridge pattern as they belong to a dominant local orientation, while suppressing the scar lines as it is oriented against the dominant direction. This method used a band pass directional filter to remove the uneven background and to suppress high-frequency noise. This method is based on the incorrect assumption that fingerprints exhibit everywhere a well-defined local ridge orientation. Although the scheme was successful to diminish the scar lines at some places, it was not able to eliminate them completely from the image.

Digital inpainting techniques are commonly used to reconstruct small damaged portions of an image, for example in applications such as reconstructing scans of deteriorated images by removing scratches or stains, removing text and logos from still images or videos, or creating artistic effects. Most inpainting methods work by first selecting the image regions which need inpainting and then the known image information is used to fill in the missing areas by propagating inward from the region boundaries. In order to produce a good reconstruction, an inpainting technique should attempt to continue lines of equal gray value as smoothly as possible inside the reconstructed region. In Bertalmio et al., "Image Painting," in *SIGGRAPH* 2000, *Computer Graphics Proceedings, Annual Conference Series*, 2000, pp. 417-424, and Bertalmio, et al., "Navier-stokes, fluid dynamics, and image and video inpainting," in ICCV 2001, 2001, pp. 1335-1362, the image smoothness information is propagated along the isophotes directions, estimated by the image gradient rotated 90 degrees. Image Laplacian is used to calculate the gradient.

Later, Telea, in "An image inpainting technique based on the fast marching method," *Journal of Graphics Tools*, vol. 9, no. 1, 2004, pp. 23-34, proposed a new technique for inpainting by propagating an image smoothness estimate along the image gradient. The missing regions are treated as level sets and a fast marching method is used to propagate the image information.

SUMMARY OF THE INVENTION

The problems with prior art methods and systems for removing scars from fingerprint images are addressed and solved by the present invention which comprises in one aspect a computer system programmed to executed a method of scar removal which makes use of both frequency domain based directional field and spatial domain image inpainting. From experiments it is found that the proposed scheme can reconstruct a scar line.

In another aspect the invention comprises a method for automated fingerprint identification comprising:
identifying a scar region in a set of pixels in a fingerprint image by using a second order Gaussian derivative filter parameterized using standard deviation, wherein the scar region has a width greater that the width of a regular ridge or a valley of separation between ridges; wherein a boundary, intensity, and flow direction of each pixel is calculated; each pixel being connected to a next adjacent pixel using flow co-ordinates and flow directions; wherein the Gaussian derivative filter has an output and the output is thresholded to create an output mask with value=1 at the scar regions and value=0 outside the scar regions; and
changing the intensity of pixels in the identified scar region with the intensity of the nearest boundary pixel until the intensities of all the pixels in the scar region are changed to the intensity of their flow direction identified boundary pixels.

The computer system and related method of the invention receive a fingerprint image, estimate directional field of the image, create a binary mask, and fill identified scars.

Other aspects of the system and method comprise decomposing the fingerprint image into directional images by means of a directional filter bank.

In some embodiments directional images are analyzed to calculate local energy of features present in a specific direction, selecting a specific direction with a large energy component, and calculating the flow direction associated with each pixel.

Some embodiments comprise creating a binary mask image by applying the second order Gaussian derivative filter to provide high response to scar regions and low response to the corresponding regular ridge and valley region.

In some embodiments the binary mask image is used to identify the boundary curve of the scar region and the scar region is with boundary pixels and non-scar neighboring pixels are calculated using flow directions.

DETAILED DESCRIPTION

Figure 1:
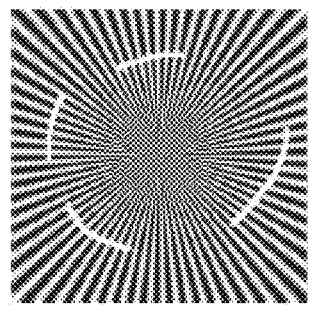
FIG. 1 is a synthetic image showing a radial pattern with intensity varying along a circular path.
Figure 2:
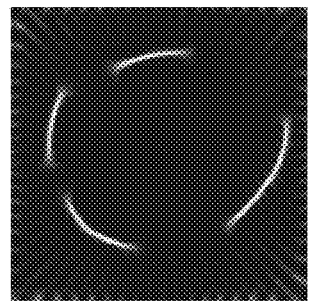
FIG. 2 is a synthetic image illustrating the result of scar detection on the FIG. 1 image using only second order Gaussian filtering.
Figure 3:
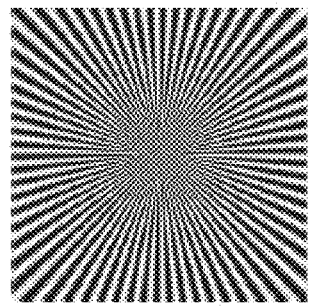
FIG. 3 is a synthetic image where scar regions have been filled using directional field of the image of FIG. 2.

Referring first to the drawings, FIGS. 1-3 illustrate removal of scars in a radial sinosoidal pattern wherein FIG. 1 shows a radial pattern with intensity varying along a circular path wherein the contrast of the image changes gradually from peak at the center to low at the outer boundary of the image. The scars are artificially created on top of the pattern at four different spatial locations and vary in width and direction as the progress from start to end.

FIG. 2 shows the result of scar detection using second order Gaussian derivative filter according to the prior art. Only scar regions are highlighted while suppressing all other image features.

FIG. 3 shows an image calculated according to the invention from the image of FIG. 2 where the scar regions are filled using the directional field of the image. The overall pattern is restored reasonably well and scars are removed.

Figure 4:
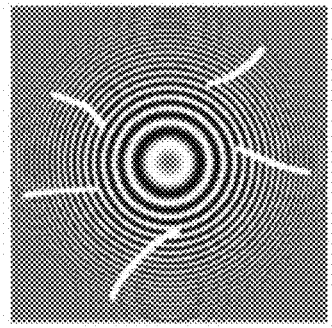
FIG. 4 is a synthetic image showing a radial pattern with intensity varying radially outward.
Figure 5:
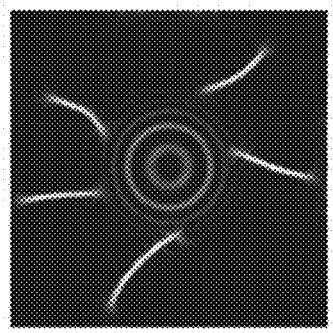
FIG. 5 is a synthetic image illustrating the result of scar detection on FIG. 4 using only second order Gaussian filtering.
Figure 6:
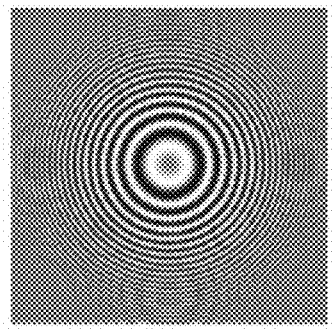
FIG. 6 is the image of FIG. 5 where scar regions have been filled using directional field of the image.

FIGS. 4-6 show removal of scars in a circular sinusoidal pattern wherein FIG. 4 shows a radial pattern with intensity varying radially outward and contrast changing gradually from peak at the end to low at the other end of the circular rings. The scars are artificially created on top of the pattern at five different spatial locations and vary in width and direction as they progress from start to end.

FIG. 5 shows the result of scar detection using only second order Gaussian derivative filtering according to the prior art wherein some image features are being picked by the filter in addition to scar regions. The image features picked are lower in intensity as compared to the scar regions and can be removed from the binary mask image using an appropriate threshold as shown in FIG. 6 where the scar regions are duly filled with circular directional field of the image.

Figure 7A:
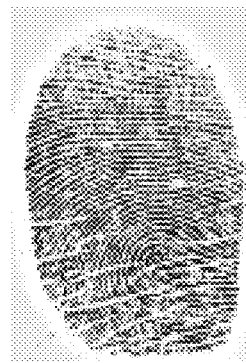
FIG. 7(a) is a uniformly illuminated fingerprint image, showing considerable scars.

FIG. 7(a) is a uniformly illuminated fingerprint image, showing considerable scars.

Figure 7B:
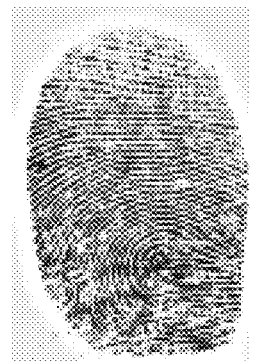
FIG. 7(b) is the fingerprint image of FIG. 7(a) after it has been processed by the method of the invention.

FIG. 7(b) is the fingerprint image of FIG. 7(a) after it has been processed by the method of the invention in which the scar regions are identified in a set of pixels in the fingerprint image by using a second order Gaussian derivative filter parameterized using standard deviation, wherein the scar region is identified as having a width greater that the width of a regular ridge or a valley of separation between ridges; wherein a boundary, intensity, and flow direction of each pixel is calculated; each pixel being connected to a next adjacent pixel using flow co-ordinates and flow directions; wherein the Gaussian derivative filter has an output and the output is thresholded to create an output mask with value=1 at the scar regions and value=0 outside the scar regions; and the intensity of pixels in the identified scar region are changed to the intensity of the nearest boundary pixel until the intensities of all the pixels in the scar region are changed to the intensity of their flow direction identified boundary pixels.

The scar filling method of the invention and the algorithm programmed into the special purpose computer system of the invention comprise, in general, acquiring a fingerprint image, estimating directional field, creating a binary mask, and filling the scar regions.

The method of the invention for filling the scar regions is directed to improving an Automated Fingerprint Identification System (AFIS). The method uses the local flow directions to providing the best candidate for filling scar regions. Each pixel in the scar region is connected with its nearest boundary pixel using flow co-ordinates and replacing scar pixels with the intensity of a matched boundary pixel. The method relies on identifying the scar regions to be filled. This identification achieved by employing second-order Gaussian derivative filters. These filters are parametrized using standard deviation. By observing that scar width is larger than the width of the regular ridge or valley separation, the second-order Gaussian derivative filter is able to successful pick the scar regions. By thresholding the output response of the filter, a binary mask image is created with value one at scar locations, while zero at all other places. Using the mask image, first boundary of the scar region is identified and the scar pixels close to the boundary are filled using their respective flow directions. Following flow direction enables avoidance of mixing the ridge/valley pattern. Once the boundary pixels are filled, they are used to fill the inner pixel turn-by-turn, each time a new boundary is identified. In this way, the boundary starts moving inward as the scar region started getting filled until all the scar pixels are filled with their appropriate flow-direction based neighbors. These neighbors could also be referred to as curved neighbors. Testing and validation for the proposed scar removal strategy is conducted for circular and radial test patterns and are shown to provide reasonable compensation for scar region as illustrated in FIGS. 1-3 and FIGS. 4-6, respectively and in FIG. 7a compared to FIG. 7b.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A method for automated fingerprint identification comprising:

identifying a scar region in a set of pixels in a fingerprint image by using a second order Gaussian derivative filter parameterized using standard deviation, wherein the scar region has a width greater that the width of a regular ridge or a valley of separation between ridges; wherein a boundary, intensity, and flow direction of each pixel is calculated; each pixel being connected to a next adjacent pixel using flow co-ordinates and flow directions; wherein the Gaussian derivative filter has an output and the output is thresholded to create an output mask with value=1 at the scar regions and value=0 outside the scar regions; and changing the intensity of pixels in the identified scar region with the intensity of the nearest boundary pixel until the intensities of all the pixels in the scar region are changed to the intensity of their flow direction identified boundary pixels.

2. The method of claim 1 comprising decomposing the fingerprint image into directional images by means of a directional filter bank.

3. The method of claim 2 wherein the directional images are analyzed to calculate local energy of features present in a specific direction, selecting s specific direction with a large energy component, and calculating the flow direction associated with each pixel.

4. The method of claim 1 comprising creating a binary mask image by applying the second order Gaussian derivative filter to provide high response to scar regions and low response to the corresponding regular ridge and valley region.

5. The method of claim 4 comprising using the binary mask image to identify the boundary curve of the scar region.

6. The method of claim 4 comprising filling the scar region with boundary pixels and calculating non-scar neighboring pixels using flow directions.

7. The method of claim 6 comprising moving the boundary inward as boundary scars are filled until all scar pixels are filled.

\* \* \* \* \*